US011659145B2

(12) United States Patent
Obaidi

(10) Patent No.: US 11,659,145 B2
(45) Date of Patent: May 23, 2023

(54) EVENT IDENTIFICATION AND NOTIFICATION VIA AN AUTOMATION HUB

(71) Applicant: T-Mobile USA, Inc., Bellevue, WA (US)

(72) Inventor: Ahmad Arash Obaidi, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 420 days.

(21) Appl. No.: 16/711,197

(22) Filed: Dec. 11, 2019

(65) Prior Publication Data

US 2020/0118377 A1 Apr. 16, 2020

Related U.S. Application Data

(63) Continuation of application No. 15/276,312, filed on Sep. 26, 2016, now Pat. No. 10,553,052.

(51) Int. Cl.
*G07C 9/37* (2020.01)
*G06K 9/62* (2022.01)
(Continued)

(52) U.S. Cl.
CPC ............ *G07C 9/37* (2020.01); *G06K 9/6201* (2013.01); *G06Q 10/083* (2013.01); *H04N 7/188* (2013.01)

(58) Field of Classification Search
None
See application file for complete search history.

(56) References Cited

U.S. PATENT DOCUMENTS

2006/0287914 A1 12/2006 Shelley
2015/0116109 A1 4/2015 Fadell et al.
(Continued)

FOREIGN PATENT DOCUMENTS

KR 1020090046743 A 5/2009
KR 1020150144360 A 12/2015

OTHER PUBLICATIONS

PCT Application No. PCT/US2017/053345, International Search Report and Written Opinion dated Jan. 5, 2018, 14 pages.
(Continued)

*Primary Examiner* — Stuart D Bennett
(74) *Attorney, Agent, or Firm* — Han Santos, PLLC

(57) ABSTRACT

An automation hub may automatically identify the arrival of a package to a location and provide a notification of the delivery to a user. A package authenticator may be generated via the automation hub at the location for embedment in a packaging of a product that is being ordered from a merchant for delivery to the location. Subsequently, the package authenticator may be associated with a pending delivery of the product at the location in response to receiving an indication that the package authenticator is submitted to the merchant via an order. The presence of an arrived package authenticator may be detected in proximity of the location via a sensor that is connected to the automation hub. A notification of arrival for the product may be generated for presentation on connected user devices in response to the arrived package authenticator matching the package authenticator.

17 Claims, 7 Drawing Sheets

(51) Int. Cl.
*H04N 7/18* (2006.01)
*G06Q 10/083* (2023.01)

(56) References Cited

U.S. PATENT DOCUMENTS

| | | |
|---|---|---|
| 2015/0156031 A1* | 6/2015 | Fadell .................. G08B 27/003 |
| | | 700/90 |
| 2015/0210287 A1 | 7/2015 | Penilla et al. |
| 2016/0086128 A1 | 3/2016 | Geiger et al. |
| 2016/0180667 A1 | 6/2016 | Bunker et al. |
| 2016/0210591 A1 | 7/2016 | LaFrance |
| 2017/0262790 A1 | 9/2017 | Khasis |
| 2019/0051128 A1* | 2/2019 | Yamashiro ............. G08B 25/04 |

OTHER PUBLICATIONS

U.S. Appl. No. 15/276,312, Non Final Office Action dated Mar. 21, 2019, 34 pages.
U.S. Appl. No. 15/276,312, Notice of Allowance dated Sep. 25, 2019, 23 pages.
U.S. Appl. No. 16/711,213, Office Action dated May 12, 2022, 32 pages.
U.S. Appl. No. 16/711,213, Final Office Action dated Oct. 14, 2022, 37 pages.

* cited by examiner

EVENT IDENTIFICATION AND NOTIFICATION VIA AN AUTOMATION HUB

RELATED APPLICATIONS

The present application is a continuation application of U.S. patent application Ser. No. 15/276,312, filed Sep. 26, 2016, entitled "Event Identification and Notification Via an Automation Hub," which is hereby incorporated by reference in its entirety.

BACKGROUND

An automation hub may be used to control the automation of temperature control, lighting, appliances, and access. The automation hub may control multiple devices, such as sensors, controllers, and switches that are connected to the automation hub, as well as generate messages regarding the operational statuses of the multiple devices. The automation hub may be deployed at a residential location or a business location to provide convenience, security, and comfort to users at the location. The automation hub may have network connectivity capabilities, such that the automation hub communicates with additional user devices that are remote to the location. For example, the user devices may be smartphones, tablet computers, and embedded computing devices.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
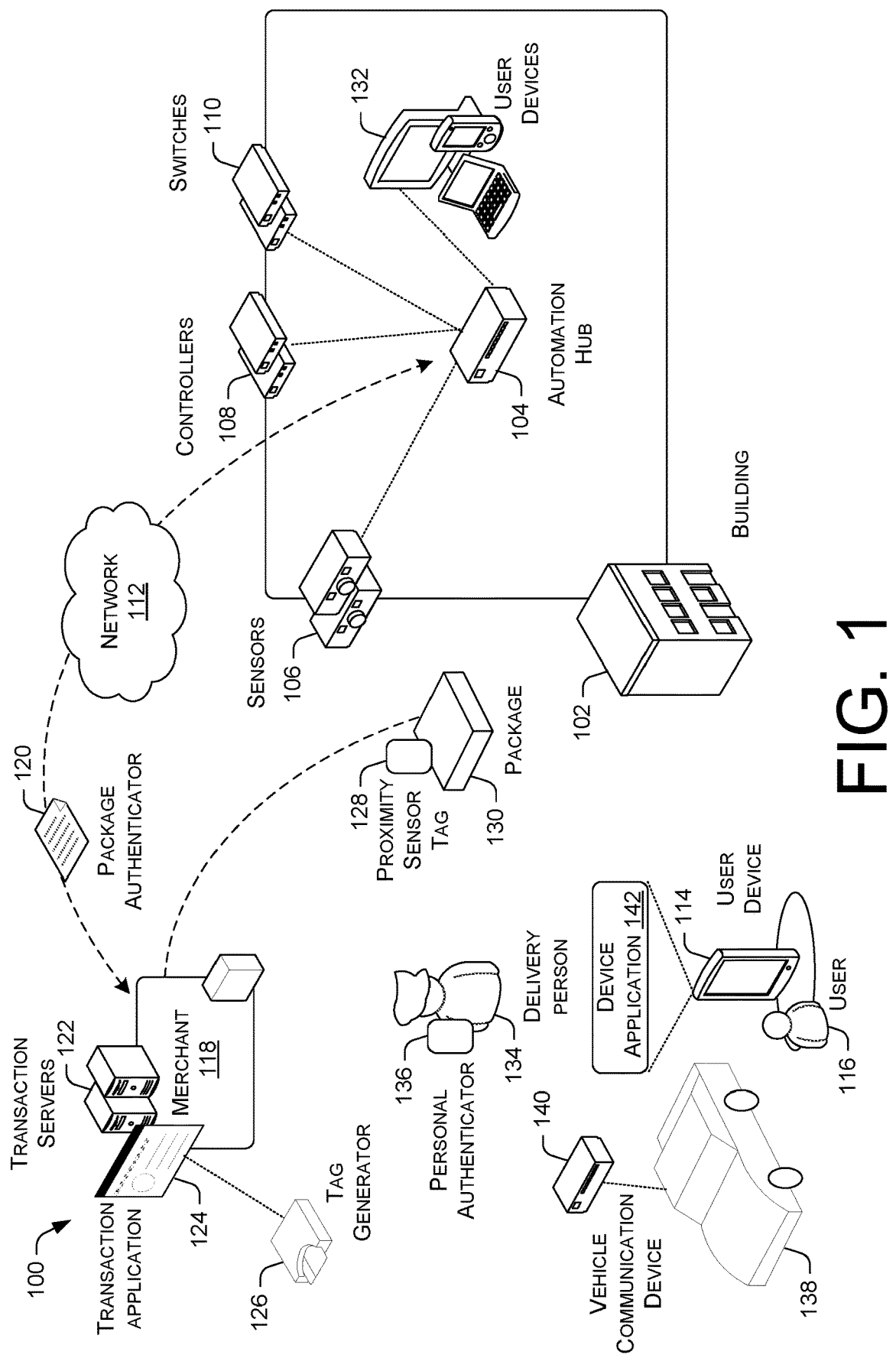
FIG. 1 illustrates an example scheme for performing event identification and notification via an automation hub.

This disclosure is directed to techniques for using an automation hub to identity event occurrences and provide notifications regarding the event occurrences. The events may include the delivery of a package to a delivery location, the arrival of a service person at a service location, or the expected arrival of a user at a home of the user. The automation hub may be deployed at a residential location or a business location to provide convenience, security, and comfort to users at the location. The automation hub may be a control unit that controls multiple devices, such as sensors, controllers, and switches that are connected to the automation hub, as well as generate automatic notification messages regarding the operational statuses of the multiple devices.

With respect to the delivery of a package, the automation hub may sense via a proximity sensor that a package has arrived at a delivery location. In turn, the automation hub may generate a notification that informs a user that the package has arrived at the delivery location. Alternatively, the automation hub may use an image sensor and an image recognition algorithm to detect the arrival of the package at the delivery location. In instances in which a delivery person or service person is seeking to obtain access to a building at the location, the automation hub may use a personal authenticator of the delivery or service person to verify the identity of the person prior to providing a notification regarding the arrival of the person. In other instances, the automation hub may use geolocation data that is transmitted by a vehicle communication device and a mobile user device (e.g., a smartphone) to determine that a user is heading to a destination location. Accordingly, the automation hub may calculate an estimated time of arrival for the user and activate one or more connected devices to perform specific actions. The actions may include notifying one or more other users (e.g., family members, friends, etc.) regarding the imminent arrival of the user. However, in some scenarios, the automation hub may reroute the user to complete one or more tasks prior to the arrival of the user at the destination location.

In at least one embodiment, a package authenticator may be generated via the automation hub at the location for embedment in a packaging of a product that is being ordered from a merchant for delivery to the location. Subsequently, the package authenticator may be associated with a pending delivery of the product at the location in response to receiving an indication that the package authenticator is submitted to the merchant via an order. The presence of an arrived package authenticator may be detected in proximity of the location via a sensor that is connected to the automation hub. A notification of arrival for the product may be generated for presentation on connected user devices in response to the arrived package authenticator matching the package authenticator.

The techniques may enable an automation hub to automatically identify the arrival of a package to a destination location and provide a notification of the delivery to a user. For example, a delivery person may drop off the package at an exterior entrance to the building while the user is away from the building. Accordingly, the user may make arrangements to secure the package to prevent theft or damage to the package. For example, the user may make a trip to the destination location to secure the package (e.g., move the package into the building) or arrange for another person to secure the package. In alternative instances, the verification of the identity of a delivery person or a service person who seeks entry into a destination building by the automation hub may provide a margin of safety to persons who are inside the destination building. This is because the persons inside may otherwise be fearful or reluctant to admit the delivery person or the service person. Furthermore, the detection of an imminent arrival of a user at a destination location may enable the automation hub to perform automatic actions that prepares for the arrival of the user at the destination. Example implementations are provided below with reference to the following figures.

Example Scheme

FIG. 1 illustrates an example scheme 100 for performing event identification and notification via an automation hub. The scheme 100 may include a building 102 that is equipped with an automation hub 104. The building 102 may be a residence, a business facility, or any enclosed structure with access controlled entrances. The automation hub 104 may be a control unit that controls multiple devices, such as sensors 106, controllers 108, and switches 110 that are connected to the automation hub. The control unit may further generate automatic notification messages. In some instances, the automatic notification messages may pertain to the operational statuses of the multiple devices. In other instances, the automatic notifications may pertain to events that are detected or initiated by the multiple devices. Accordingly, the automation hub 104 may provide convenience, security, and comfort to users at the building 102. For example, the automation hub may provide automatic control of temperature, lighting, appliances, access control mechanisms, and/or so forth for a business structure or a residential dwelling. The notifications that are generated by the automation hub may be provided to one or more user devices for presentation to users via a network 112. Such user devices may include a user device 114 that is operated by a user 116. The notifications may be in the form of text messages, application alerts, application pop-up banners, and/or so forth, that are displayed by different devices.

The user device 114 may be a smartphone, a tablet computer, an embedded computer system, or any other device that is capable of using wireless communication services that are provided by the network 112. The user device 114 may have software and/or hardware components that are configured to interface with the automation hub 104. The network 112 may include a local area network ("LAN"), a larger network such as a wide area network ("WAN"), or a collection of networks, such as the Internet. In other instances, the network 112 may include a carrier network operated by a telecommunication carrier. The carrier network may provide telecommunication and data communication in accordance with one or more technical standards, such as such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth.

In some embodiments, the automation hub 104 may assist in tracking the arrival of a package. In such embodiments, the user 116 may order a product from a merchant 118. The order may be initiated via an online transaction, a telephone transaction, or an in-store transaction. The order may involve the purchasing or leasing of the product. Alternatively, the product may be gratuitously provided to the user via the order. During the transaction, the user 116 may activate the automation hub 104 to generate a package authenticator 120. For example, the package authenticator 120 may be a unique code or identifier that is generated by the automation hub 104. Accordingly, the user 116 may submit the package authenticator 120 to a transaction server 122 of the merchant 118. The transaction server 122 may be a server controlled by the merchant 118 that executes a transaction application 124. The transaction application 124 may be responsible for receiving orders for products, obtaining payments for the product, directing the fulfillment of the products, and tracking shipments of the products. The package authenticator 120 associated with the order of the product by the user 116 may be provided to the transaction server 122 by the user 116 via an online order web page. For example, the online order web page may include a special text field for the entry of the package authenticator 120. Alternatively, the package authenticator 120 may be provided by the user 116 to the transaction server 122 through entry via a numeric keypad of a telecommunication device, or entered into the transaction server 122 by an in-store employee of the merchant 118 on behalf of the user 116. In response to receiving the package authenticator 120, the transaction application 124 may command a tag generator 126 to generate an encoded proximity sensor tag 128 that embeds the package authenticator 120. For example, the encoded proximity sensor tag 128 may be a radio-frequency identification (RFID) tag or a near field communication (NFC) tag. The encoded proximity sensor tag 128 may be affixed to or inside a package 130 prepared by the merchant 118 or a third-party shipper that contains the product ordered by the user 116.

In the meantime, the automation hub 104 may generate an expected package arrival database entry that associates the package authenticator 120 with the product ordered by the user 116. Aside from the package authenticator 120, the expected package arrival entry may further include information such as a name of the product ordered, a description of the product ordered, an expected arrival date of the product, a name of the recipient, and/or so forth. In at least one embodiment, such information may be provided by the transaction application 124 as the user completes the order of the product with the merchant 118. In some instances, the expected package arrival entry may be stored in an expected delivery database with one or more other expected package arrival entries.

When the package 130 is delivered to the building 102, a sensor that is connected to the automation hub 104 may detect the package authenticator 120. For example, the sensor may be a NFC sensor positioned at a delivery entrance of the building 102 that is configured to detect encoded proximity sensor tags that are placed within a predetermined distance from the sensor. Upon detection of the package authenticator 120, the automation hub 104 may check the package authenticator 120 against the expected delivery database. Accordingly, the automation hub 104 may determine that the package authenticator 120 matches an expected package. Accordingly, the automation hub 104 may generate a notification of product arrival for presentation on connected user devices. The connected user devices may include the user devices 132. The user devices may be connected to the automation hub 104 via the network 112 or a local area network. For example, the user devices 132 may include the user device 114 as the user 116 is traveling offsite from the building 102. Alternatively or concurrently, the user devices 132 may include a laptop computer, a smart television, a mobile phone, and/or so forth, which are located inside the building 102.

The notification may prompt one or more users to take active steps to secure the package 130, thereby shortening the duration during which the package 130 is susceptible to theft or damage. For example, a user inside the building 102 may view the notification via a smart television. In response, the user may retrieve the package 130 from the delivery entrance of the building 102 for safekeeping inside the building 102 or another secure location. In another example, the user 116 may receive the notification via the user device 114. In turn, the user 116 may request via a telephone call or a text message that an additional user that is closer to the building 102 retrieve the package for safekeeping. In an additional example, the user 116 may travel back to the building 102 to secure the package 130.

In additional embodiments, the automation hub 104 may generate a package arrival notification for the delivery of a package that lacks a package authenticator. In such embodiments, the automation hub 104 may store delivery information regarding a pending delivery of such a package. For example, the automation hub 104 may be configured to automatically receive such information from a user device application that is used to order the product. Alternatively, the user 116 may input the pending delivery information (e.g., delivery date, sender information, recipient information, package description, package description, etc.) into the automation hub 104 via a user interface page. The package description may include product name, product model number, product image, product inventory number, and/or so forth. The package description may include package dimension, package weight, package color, and/or so forth. The automation hub 104 may store the information in a package description database for pending deliveries.

The automation hub 104 may be equipped with an image recognition algorithm that is capable of determining the dimensions of objects, as well as recognizing graphics and texts. Thus, when image sensors (e.g., a video camera, an infrared camera, a still-shot camera, etc.) that are connected to the automation hub 104 detects the presence of a stationary object at the delivery entrance of the building 102, the automation hub 104 may use the image recognition algorithm to ascertain the identity of the object. In such instances, the automation hub 104 may compare image feature details of the object that are recognized by the image recognition algorithm to package description details that are stored in the package description database. The automation hub 104 may determine that the object matches a package that contains a product when a minimal number of images feature details match the details in the package description for a product. Subsequently, the automation hub 104 may generate a notification of product arrival for presentation on connected user devices in the same manner as described above.

In alternative embodiments, the package 130 may be delivered to the building 102 by a delivery person 134. The delivery person 134 may be wearing a personal authenticator 136. Thus, the automation hub 104 may further verify the personal authenticator 136 of the delivery person 134. In such embodiments, the delivery person 134 may be assigned to deliver the package 130 to the building 102. As such, the personal authenticator 136 may be associated with the package authenticator 120 of the package 130 in a pending delivery database entry stored in a verification database. The verification database may reside on a verification server that is operated by the merchant 118 or a shipping company that assigned the delivery person 134 to deliver the package 130. The personal authenticator 136 may be a unique personal identifier of the delivery person 134 that is embedded in an encoded proximity sensor tag or broadcast by a proximity data transceiver. For example, the proximity data transceiver may be a RFID transceiver or a NFC transceiver. The encoded proximity sensor tag or the proximity data transceiver may be embedded in a name tag, an identification badge, or a user device, and/or so forth.

When the delivery person 134 arrives with the package 130, the delivery person 134 may seek access to the building 102 to deliver the package 130. For example, the delivery person 134 may trigger a door buzzer or a door intercom that is connected to the automation hub 104. A NFC sensor of the automation hub 104 at the delivery entrance of the building 102 may detect the personal authenticator 136 of the delivery person 134. The automation hub 104 may send the detected personal authenticator 136 and the detected package authenticator 120 to the verification server. In turn, the verification server may compare the detected personal authenticator and package authenticator to entries in the verification database. Upon determining that there is a pending delivery entry that matches both the detected personal authenticator and the detected package authenticator, the verification server may return an indication that the personal authenticator is valid for the delivery attempt to the automation hub 104. In response, the automation hub 104 may generate a notification that a particular product included in the package 130 has arrived and the delivery person is authorized to make the delivery. The notification may be presented by the automation hub 104 on the connected user devices 132, such notification may prompt a user inside the building 102 to grant access to the delivery person 134. Alternatively or concurrently, the automation hub 104 may automatically unlock a delivery entrance door by activating a door switch to permit the delivery person 134 entry into the building 102.

In other embodiments, rather than the delivery person 134, the personal authenticator 136 may belong to a service person that is seeking access to the building 102 to provide a service. For example, the service person may be an appliance repair person, a plumber, or another type of service provider. In such embodiments, the verification server may be operated by a service provider or a third-party on behalf of the service provider, and the personal authenticator 136 may be associated with a particular service that is scheduled to be performed on a specific scheduled date and/or time window in a pending service entry in a verification database. Accordingly, the automation hub 104 may provide the detected personal authenticator 136 along with the date and/or time to the verification server. The server may check the verification database to verify that a pending service entry exists for the personal authenticator, and that the associated date and/or time falls within the scheduled date and/or time window. When the information match, the verification server may return an indication that the personal authenticator is valid for the scheduled service call. In response, the automation hub 104 may generate a notification that the service person is authorized to perform the scheduled service call. The notification may be presented by the automation hub 104 on the connected user devices 132, such notification may prompt a user inside the building 102 to grant access to the service person. Alternatively or concurrently, the automation hub 104 may automatically unlock an entrance door by activating a door switch to permit the service person entry into the building 102.

In other implementations, the automation hub 104 may be used to activate one or more connected devices in the building 102 upon the detection of the imminent occurrence of an event. In one instance, the event may be the arrival of a user 116 at the location of the building 102. In such an instance, the user 116 may be traveling to the location of the building 102 in a vehicle 138. The vehicle 138 may be equipped with a vehicle communication device 140. The vehicle communication device 140 may provide communication, in-vehicle security, trouble diagnostics, and/or global positioning system (GPS) navigation capabilities by communicating with multiple service providers via a cellular communication network. Accordingly, the vehicle may use the cellular communication network to send the geolocations of the vehicle 138 to the automation hub 104. The user 116 may also have the user device 114, in which the user device 114 has a device application 142 that is able to ascertain the geolocations of the user device 114. The device application 142 may also use the cellular communication capabilities of the user device 114 to provide the geolocations to the automation hub 104.

In turn, the automation hub 104 may continuously monitor the geolocations of both the user device 114 and the automation hub 104. Thus, when the automation hub 104 determines that the user device 114 is within a predetermined distance to the destination location of the building 102, the automation hub 104 may make a determination as to whether the geolocation of the user device is within a predetermined proximity to the geolocation of the vehicle 138. When the geolocations are within the predetermined proximity, the automation hub 104 may determine that the user 116 is driving or riding in the vehicle 138. Subsequently, the automation hub 104 may determine a route of the vehicle 138 for reaching the destination location. The automation hub 104 may then check a task database to determine whether there are one or more tasks that can be completed at locations that are on the route. For example, the tasks may include pick up groceries, drop off drying cleaning, return a movie rental, and/or so forth. In some instances, the task database may be populated from information that are retrieved from a calendar application that is used by the user 116, or information that are inputted by users that are related to the user 116 (e.g., family members).

Accordingly, if one or more tasks can be completed, the automation hub 104 may generate task notifications for presentation on the user device 114. If the user agrees to complete the one or more tasks, the automation hub 104 may further determine an estimated time of arrival at the destination location for the user. The user may agree to complete a task by selecting an agree option that is provided by a notification presented by the user device 114. In turn, the user device 114 may transmit the user agreement to the automation hub 104. The estimated time of arrival may take into account the estimated extra time that will be spent to complete the one or more tasks. In some embodiments, the route may be modified by the automation hub 104 to account for the rerouting to one or more task locations. The automation hub 104 may generate notifications that provide the estimated time of arrival of the user 116 for delivery to one or more additional user devices. The additional user devices may belong to users or are otherwise accessible to users that are related to the user 116. For example, a smart television inside the building 102 may inform a spouse of the user 116 that the user will be arriving at home at the estimated time of arrival. In some instances, the automation hub 104 may further activate one or more connected controllers 108 or switches 110. For example, the automation hub 104 may activate a heating, ventilation, and air conditioning (HVAC) system, a lighting system, an entertainment system, and/or so forth, to prepare for the expected arrival of the user 116 at the destination location.

Example Automation Hub Components

Figure 2:
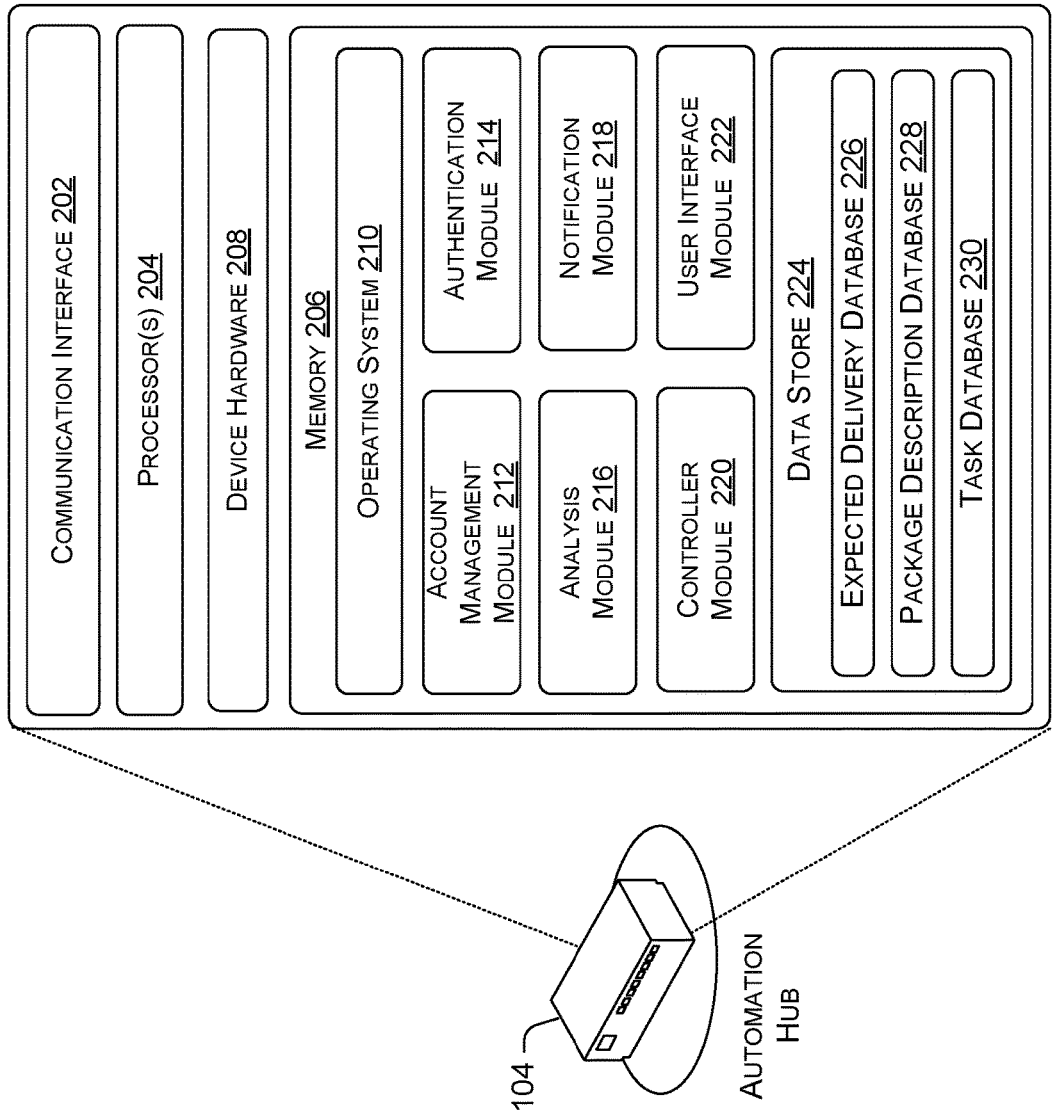
FIG. 2 is a block diagram showing various components of an automation hub that performs event identification and notification via the automation hub.

FIG. 2 is a block diagram showing various components of the automation hub 104 that performs event identification and notification via the hub. The automation hub 104 may include a communication interface 202, one or more processors 204, memory 206, and device hardware 208. The communication interface 202 may include wireless and/or wired communication components that enable the automation hub 104 to transmit data to and receive data from other networked devices via the network 112. The communication interface 202 may further include wireless and/or wired communication components (e.g., Universal Serial Bus (USB), Bluetooth, Wi-Fi, etc.) that enable the automation hub 104 to communicate with sensors 106, the controllers 108, and the switches 110. The device hardware 208 may include additional hardware that performs user interface, data display, data communication, data storage, and/or other server functions. In at least one embodiment, the device hardware 208 may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices or other electronic/software selection methods.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 204 and the memory 206 of the automation hub 104 may implement an operating system 210. The operating system 210 may include components that enable the automation hub 104 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system. The operating system 210 may be used to implement an account management module 212, an authentication module 214, an analysis module 216, a notification module 218, a controller module 220, and a user interface module 222. These modules may include routines, program instructions, objects, and/or data structures that perform particular tasks or implement particular abstract data types. The memory 206 may further include a data store 224.

The account management module 212 may enable users, such as the user 116, to create user accounts. A user may establish a corresponding user account by providing registration information to the account management module 212 via an electronic device, such as the user device 114. The registration information may include a user name, user contact information, a login name, a password, and/or so forth. The user account may enable the user to customize the automation hub 104 such that the hub may activate or deactivate the controllers 108 and switches 110 based on a set schedule or input from the sensors 106. In various embodiments, the account management module 212 may provide authentication functions that control access to the user accounts.

The authentication module 214 may generate and verify package authenticators. Each package authenticator may be a unique identifier that is assigned to an expected package when a corresponding product is ordered by a user. The authentication module 214 may store each generated package authenticator in an expected package arrival entry in an expected delivery database. Each expected package entry may further include information such as a name of the product ordered, a description of the product ordered, an expected arrival date of the product, a name of the recipient, and/or so forth. Following the detection of an encoded proximity sensor tag that contains a package authenticator by a sensor connected to the automation hub 104, the authentication module 214 may perform a validation of the package authenticator against the expected package arrival entries in the expected delivery database. Accordingly, the authentication module 214 may command the notification module 218 to generate notification messages based on the outcome of the verifications.

In some embodiments, the authentication module 214 may be configured to validate the personal authenticators of delivery persons or service persons. In such embodiments, a personal authenticator may include a unique identifier that identifies a particular delivery person or service person. The personal authenticator may further include a unique identifier that identifies the entity providing the delivery or the service. Accordingly, following the detection of a personal authenticator that is embedded in an encoded proximity sensor tag or a proximity data transceiver by a sensor connected to the automation hub 104, the authentication module 214 may send the personal authenticator to a verification server that is affiliated with the entity identified by the personal authenticator. The verification server may be operated by a service provider or a third-party that performs personal authenticator verification on behalf of the service provider. In some instances, the personal authenticator may be transmitted to the verification server along with a date and/or time that the personal authenticator is detected by the sensor. The verification server may determine whether the personal authenticator is associated with a package authenticator. Alternatively, the verification server may determine whether the personal authenticator is affiliated with a scheduled service call. The verification server may provide the outcome of the personal authenticator verification to the automation hub 104. In turn, the authentication module 214 may command the notification module 218 to send notifications to user devices based on the outcome. In some instances, the authentication module 214 may perform verification on a personal authenticator following a sensor detecting a request for building access that is initiated in the proximity of the personal authenticator.

The analysis module 216 may use an image recognition algorithm to ascertain the identity of the object. The analysis module 216 may be activated following the detection of a stationary object by a sensor of the automation hub 104. The image recognition algorithm may recognize image feature details of the object. Subsequently, the analysis module 216 may compare image feature details of the object that are recognized by the image recognition algorithm to package description details that are stored in a package description database for pending deliveries. Thus, the automation hub 104 may determine that the object matches a package that contains a product when a minimal number of feature details match the details in the package description for a product. Accordingly, the analysis module 216 may command the notification module to generate different notifications depending whether there is a match between the object and a package of a pending product delivery.

In other embodiments, the analysis module 216 may further analyze the geolocations of devices, such as the user device 114 and the vehicle communication device 140. The analytic results that are generated by the analysis may trigger the performance of certain actions or notifications. In some instances, the analysis module 216 may determine that a user is not traveling in a vehicle when geolocation of a user device 114 is outside of a predetermined proximity of the geolocation of the vehicle communication device 140. As a result, the analysis module 216 may generate a notification of such user status for distribution to other devices. In another instances, the analysis module 216 may generate an estimated time of arrival for a user device at a destination location as the user device is traveling along a route based on the geolocations of the user device during a time interval. Further, the analysis module 216 may determine whether there are one or more tasks that can be completed at locations that are on the route within a predetermined time period. If so, the analysis module 216 may command the notification module 218 to request that the user 116 associated with the user device 114 to complete the one or more tasks.

The notification module 218 may generate different notifications under the direction of the authentication module 214 and the analysis module 216. For example, the notification module 218 may generate a notification indicating that a product has arrived or that an unknown package has arrived. In another example, the notification module 218 may generate a notification indicating that a delivery person or a service person is authorized to deliver a package or make a service call. Alternatively, the notification module 218 may generate a notification that the delivery person or the service person is not authorized to deliver the package or make the service call. In various embodiments, the notification module 218 may use the communication interfaces 202 to send the notifications to user devices. The notifications may be in the form of text messages, application alerts, application pop-up banners, and/or so forth, that are displayed by the user devices.

The controller module 220 may activate or deactivate the controllers 108 or the switches 110 based on a preset schedule or input from the sensors 106. In one instance, the controller module 220 may turn on or turn off lights of the building 102 based on a predetermined schedule. In another instance, the controller module 220 may turn on an air conditioning system when a sensor senses that the temperature inside the building 102 exceeds a predetermined threshold. In additional instances, the controller module 220 may perform other more actions based on commands from the authentication module 214 and the analysis module 216.

The user interface module 222 may enable a user to access the functions of the automation hub 104 via user interfaces of the automation hub 104 or the user interfaces of a user device that is connected to the automation hub 104. The data store 224 may include one or more databases, such as relational databases, object databases, object-relational databases, and/or key-value databases that store data. The data store 224 may store an expected delivery database 226, a package description database 228, and a task database 230.

Example Processes

FIGS. 3-7 present illustrative processes 300-700 for performing event identification and notification via an automation hub. Each of the processes 300-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-700 are described with reference to the scheme 100 of FIG. 1.

Figure 3:
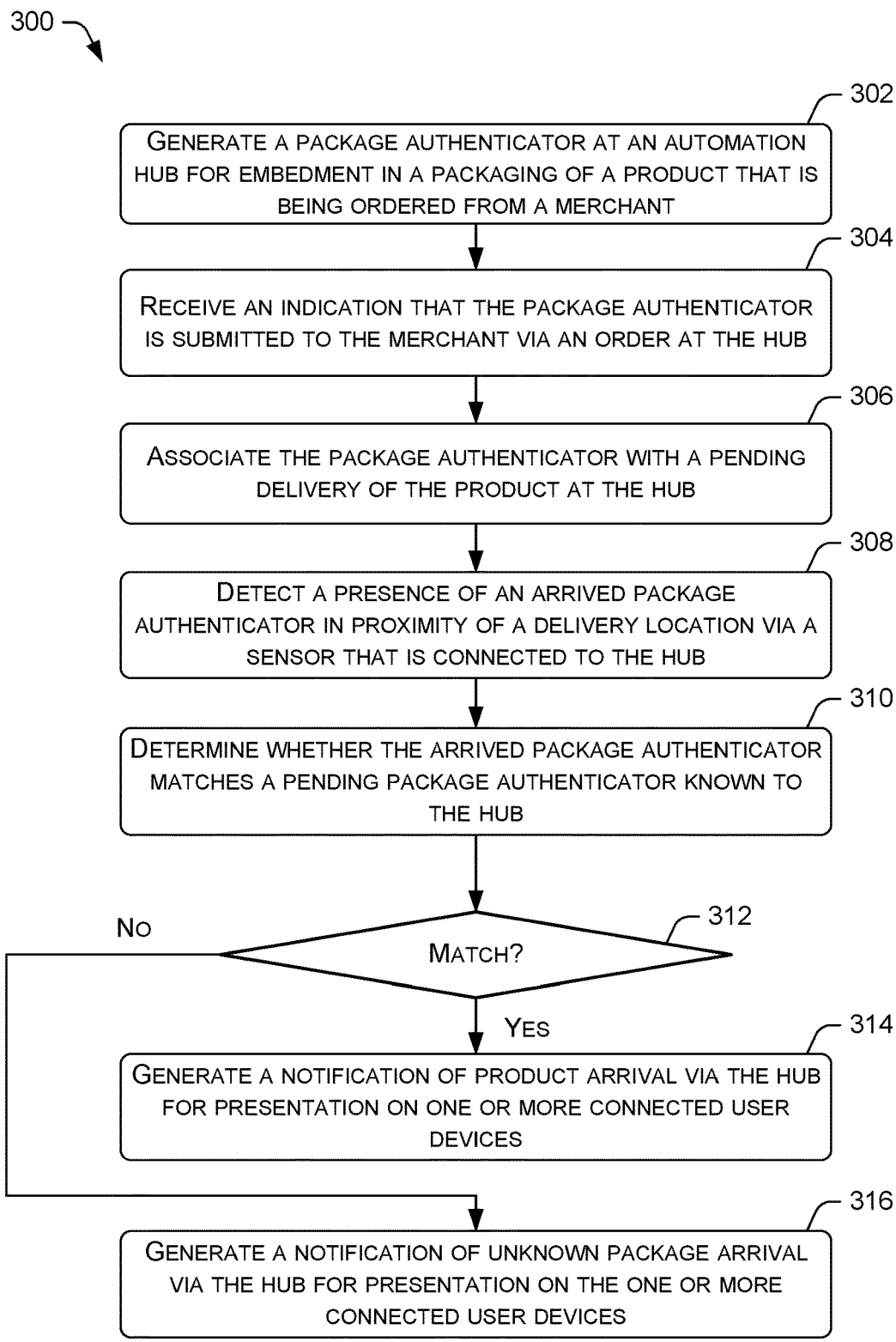
FIG. 3 is a flow diagram of an example process for using an automation hub to identify a delivered package and provide notifications regarding the delivery of the package.

FIG. 3 is a flow diagram of an example process 300 for using an automation hub to identify a delivered package and provide notifications regarding the delivery of the package. At block 302, the automation hub 104 may generate a package authenticator at the automation hub 104 for embedment in a packaging of a product that is being ordered from a merchant. The order may be initiated via an online transaction, a telephone transaction, or an in-store transaction. In alternative embodiments, the package authenticator may be generated by a transaction application and communicated to the automation hub 104 via the network 112.

At block 304, the automation hub 104 may receive an indication that the package authenticator is submitted to the merchant via an order at the automation hub 104. In various embodiments, the indication may be a confirmation of the completion of the order by the transaction application 124 that is transmitted to the device application 142 on the user device 114. In turn, the device application 142 may send the confirmation to the automation hub 104.

At block 306, the automation hub 104 may associate the package authenticator with a pending delivery of the product. In various embodiments, the automation hub 104 may generate an expected package arrival entry that associated the package authenticator with the product. The expected package arrival entry may be stored in an expected delivery database with one or more other expected package arrival entries.

At block 308, the automation hub 104 may detect a presence of an arrived package authenticator in proximity of a delivery location via a sensor that is connected to the hub. For example, the sensor may be a NFC sensor positioned at a delivery entrance of the building 102 that is configured to detect encoded proximity sensor tags that are placed within a predetermined distance from the sensor. The package authenticator may arrive at the delivery location when a package containing the product is delivered to the delivery location.

At block 310, the automation hub 104 may determine whether the arrived authenticator matches a pending package authenticator known to the hub. In other words, the automation hub 104 may check the package authenticator against the expected package arrival entries in an expected delivery database. Accordingly, at decision block 312, if the automation hub 104 determines that the arrived package authenticator matches a pending package authenticator ("yes" at decision block 312), the process 300 may proceed to block 314. At block 314, the automation hub 104 may generate a notification of product arrival for presentation on one or more connected user devices. In various embodiments, the one or more user devices may be connected to the automation hub 104 via the network 112 or a local area network. The notification may be in the form of a text message, an application alert, or an application pop-up banner.

However, if the automation hub 104 determines that the arrived package authenticator does not match a pending package authenticator ("no" at decision block 312), the process 300 may proceed to block 316. At block 316, the automation hub 104 may generate a notification that an unknown package has arrived for presentation on one or more connected user devices.

Figure 4:
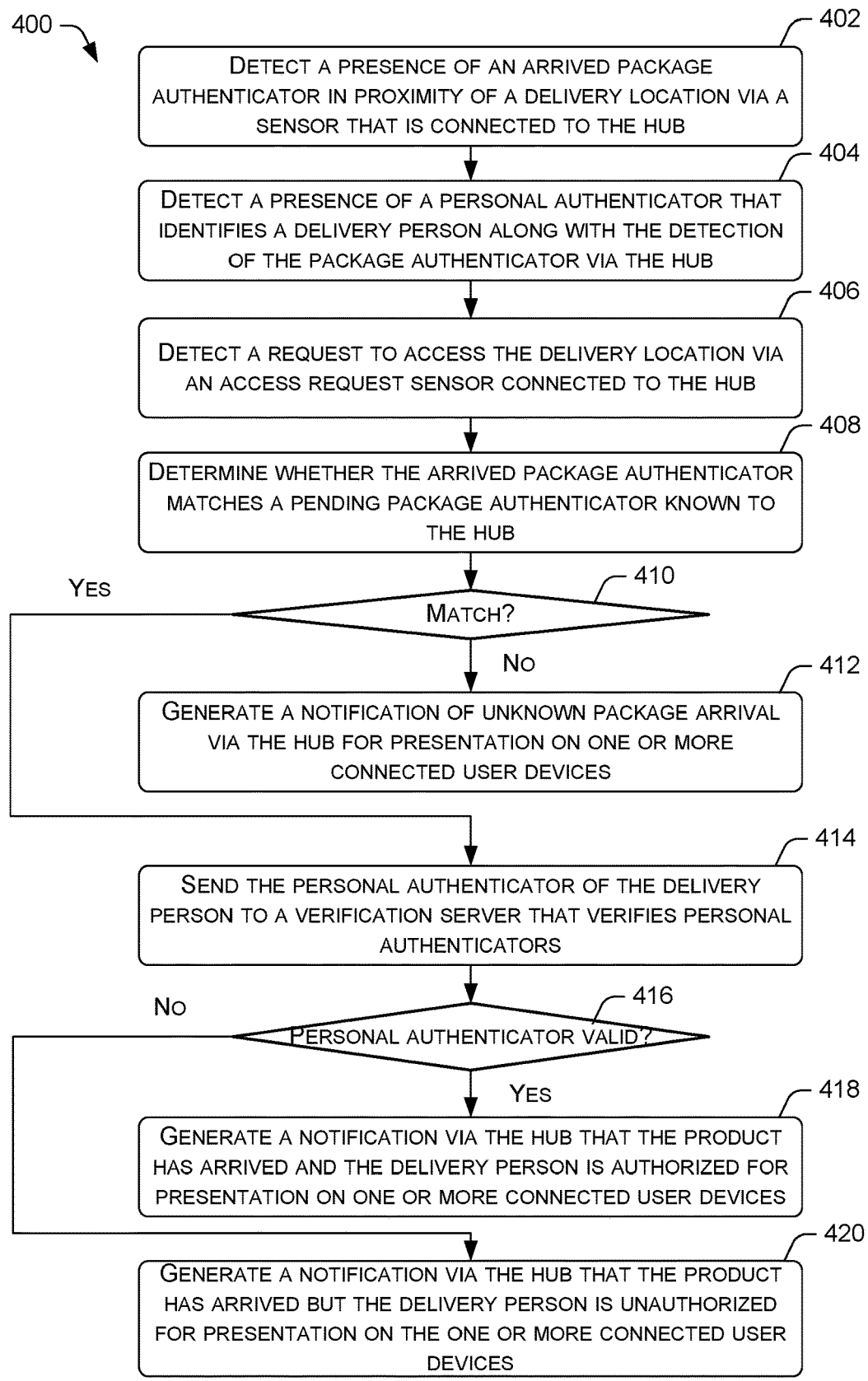
FIG. 4 is a flow diagram of an example process for using an automation hub to identify a package delivery and a delivery person and provide notifications regarding the delivery of the package.

FIG. 4 is a flow diagram of an example process 400 for using an automation hub 104 to identify a package delivery and a delivery person and provide notifications regarding the delivery of the package. At block 402, the automation hub 104 may detect a presence of an arrived package authenticator in proximity of a delivery location via a sensor that is connected to the hub. In various embodiments, the package authenticator may be generated and stored in the automation hub 104 in the same manner as described in blocks 302-306 of the process 300.

At block 404, the automation hub 104 may detect a presence of a personal authenticator that identifies a delivery person along with the detection of the package authenticator. In various embodiments, the personal authenticator may be a unique personal identifier of the delivery person that is embedded in an encoded proximity sensor tag or broadcast by a proximity data transceiver. The encoded proximity sensor tag or the proximity data transceiver may be embedded in a name tag, an identification badge, or a user device, and/or so forth.

At block 406, the automation hub 104 may detect a request to access the delivery location via an access request sensor connected to the hub. For example, the delivery location may be the building 102 and the access request may be from the delivery person. In various embodiments, the access request sensor may be a door buzzer or door intercom that is communicatively connected to the automation hub 104 and triggered by the delivery person.

At block 408, the automation hub 104 may determine whether the arrived authenticator matches a pending package authenticator known to the hub. In other words, the automation hub 104 may check the package authenticator against the expected package arrival entries in an expected delivery database. Accordingly, at decision block 312, if the automation hub 104 determines that the arrived package authenticator does not match a pending package authenticator ("no" at decision block 410), the process 300 may proceed to block 412. At block 412, the automation hub 104 may generate a notification of an unknown package arrival for presentation to one or more connected user devices. Accordingly, a person at the delivery location may choose to not grant the delivery person access to the delivery location.

However, if the automation hub 104 determines that the arrived package authenticator matches a pending package authenticator ("yes" at decision block 410), the process 400 may proceed to block 414. At block 414, the automation hub 104 may send the personal authenticator of the delivery person to a verification server that verifies personal authenticators. In some embodiments, the verification server may contain information that indicates whether the delivery person associated with the personal authenticator is scheduled to make a delivery at the delivery location at the time and/or date at which the personal authenticator is received. Accordingly, the verification server may verify that the personal authenticator is valid if the delivery person is scheduled to make the delivery. Otherwise, the verification server may return an indication that the personal authenticator is invalid.

In other embodiments, the automation hub 104 may also concurrently receive the package authenticator from the automation hub 104. In turn, the verification server may compare the detected personal authenticator and package authenticator to entries in the verification database. Upon determining that there is a pending delivery entry that matches both the detected personal authenticator and the detected package authenticator, the verification server may return an indication that the personal authenticator is valid for the delivery attempt to the automation hub 104. Otherwise, the verification server may return an indication that the personal authenticator is invalid.

Thus, at decision block 416, if the automation hub 104 receives an indication that the personal authenticator is valid, the process 400 may proceed to block 418. At block 418, the automation hub 104 may generate a notification that the product has arrived and the delivery person is authorized to make the delivery for presentation on one or more connected user devices. However, if the automation hub receives an indication that the personal authenticator is invalid, the process 400 may proceed to block 420. At block 420, the automation hub 104 may generate a notification that the product has arrived but the delivery person is unauthorized to make the delivery for presentation on the one or more connected user devices.

Figure 5:
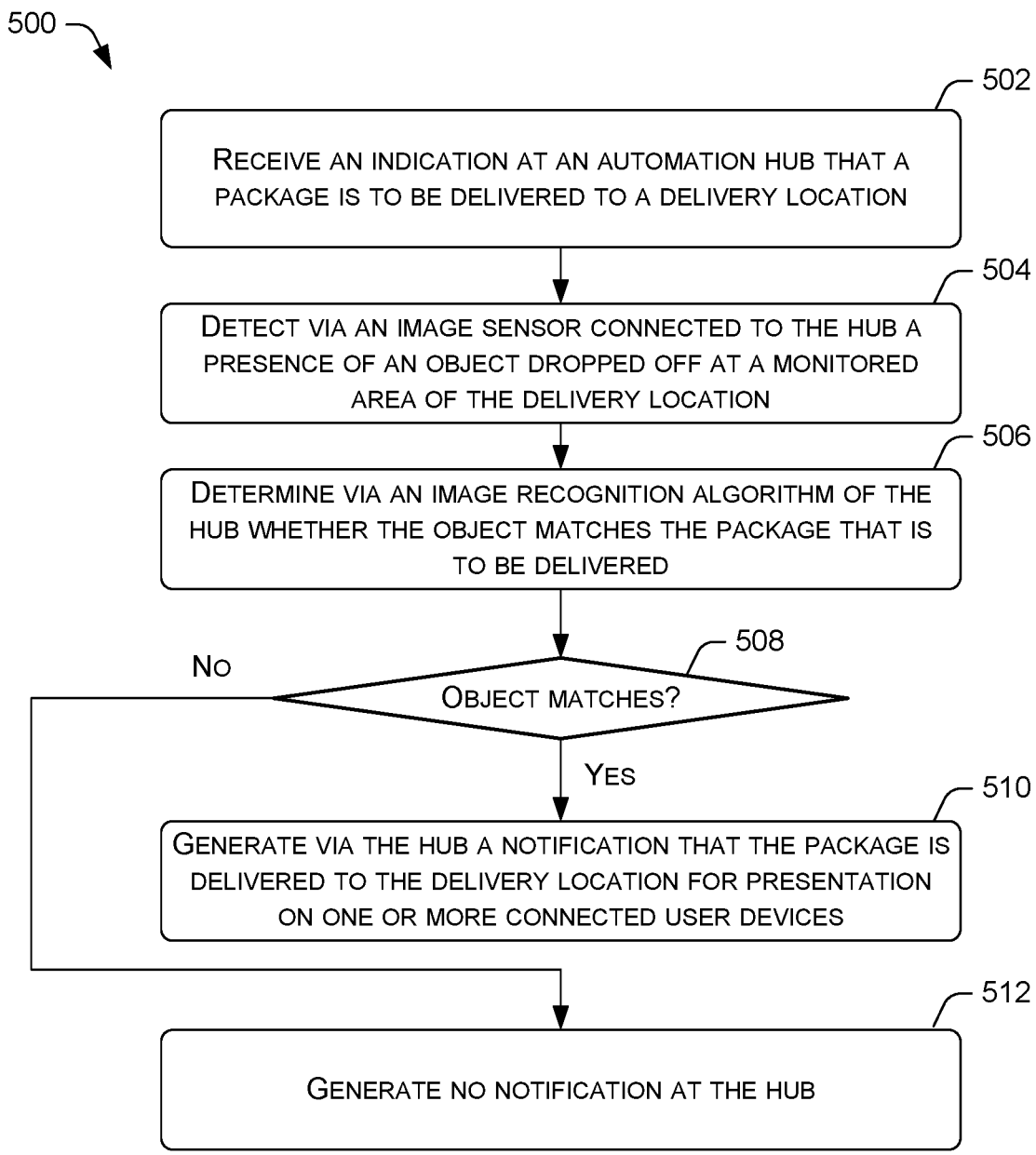
FIG. 5 is a flow diagram of an example process for using an automation hub to detect the delivery of a package and provide notifications regarding the delivery of the package.

FIG. 5 is a flow diagram of an example process 500 for using an automation hub to detect the delivery of a package and provide notifications regarding the delivery of the package. At block 502, the automation hub 104 may receive an indication that a package is to be delivered to a delivery location. In some embodiments, the indication may be transmitted by the merchant 118 or a shipper that is shipping the package on behalf of the merchant 118. In other embodiments, the indication may be manually inputted into the automation hub 104 by a user, such as the user 116. The indication may include an expected data and/or time for the delivery, as well as a package description. The package description may include product name, product model number, product image, product inventory number, and/or so forth. The package description may include package dimension, package weight, package color, and/or so forth. The automation hub 104 may store the information in a package description database for pending deliveries.

At block 504, the automation hub 104 may detect via a connected image sensor a presence of object dropped off at a monitored area of the delivery location. For example, the monitored area may be an exterior delivery entrance of the building 102. The image sensor may include a video camera, an infrared camera, a still-shot camera, and/or so forth.

At block 506, the automation hub 104 may determine via an image recognition algorithm whether the object matches the package that is to be delivered. In various embodiments, the automation hub 104 may compare image feature details of the object that are recognized by the image recognition algorithm to package description details that are stored in the package description database. Thus, the automation hub 104 may determine that the object matches a package that contains a product when a minimal number of feature details match the details in the package description for a product.

Accordingly, at decision block 508, if the automation hub 104 determines that the object matches the package that is to be delivered ("yes" at decision block 508), the process 500 may proceed to block 510. At block 510, the automation hub 104 may generate a notification that the package is delivered to the delivery location for presentation on one or more user devices. In various embodiments, the one or more user devices may be connected to the automation hub 104 via the network 112 or a local area network. The notification may be in the form of a text message, an application alert, or an application pop-up banner. However, if the automation hub 104 determines that the object does not match a package that is to be delivered ("no" at decision block 508), the process 500 may proceed to block 512. At block 512, the automation hub 104 may refrain from generating any notification.

Figure 6:
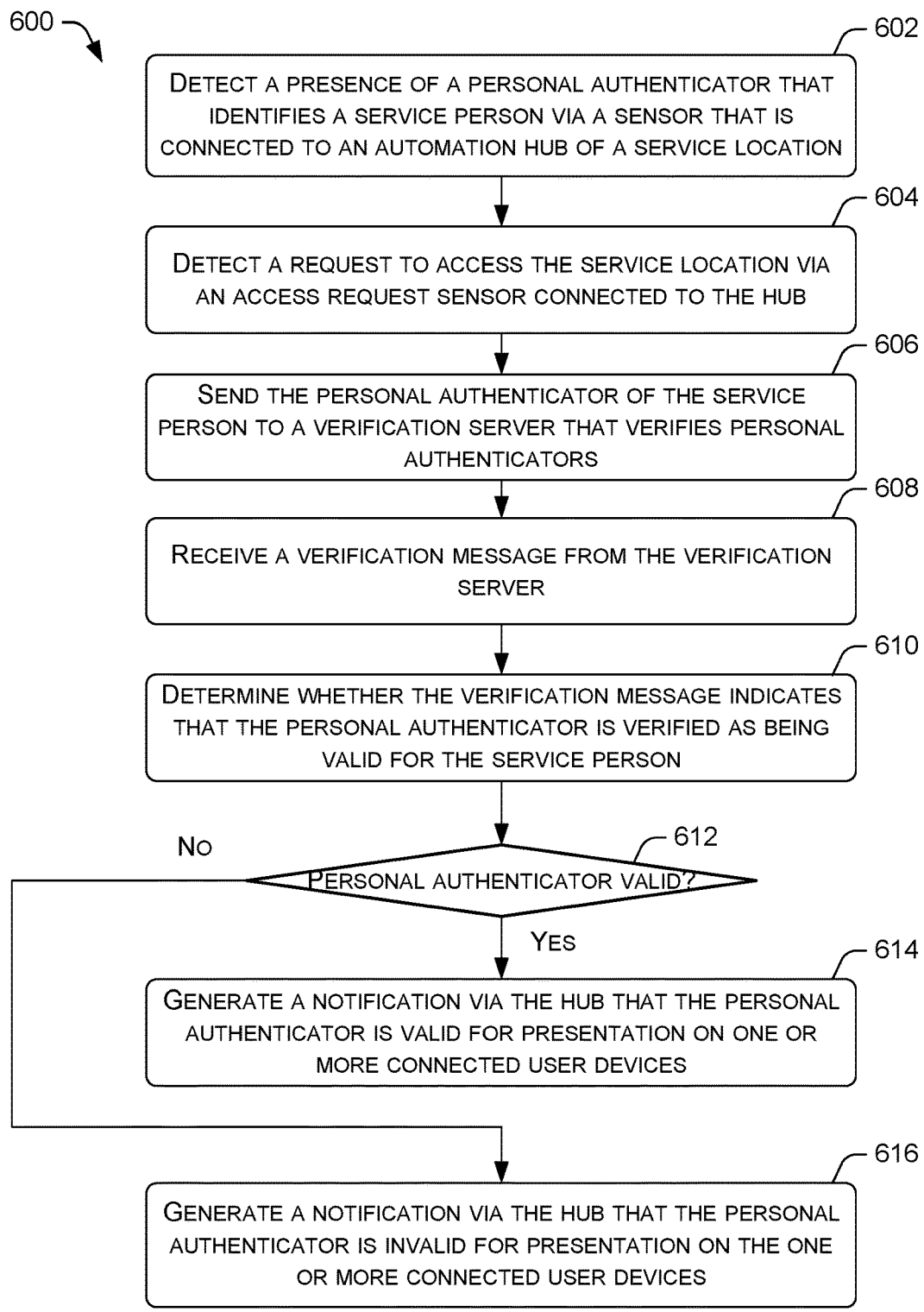
FIG. 6 is a flow diagram of an example process for using an automation hub to identify a service person and provide notifications regarding the authorization status of the service person.

FIG. 6 is a flow diagram of an example process 600 for using an automation hub to identify a service person and provide notifications regarding the authorization status of the service person. At block 602, the automation hub 104 may detect a presence of a personal authenticator that identifies a service person. In various embodiments, the personal authenticator may be a unique personal identifier of the service person that is embedded in an encoded proximity sensor tag or broadcast by a proximity data transceiver. The encoded proximity sensor tag or the proximity data transceiver may be embedded in a name tag, an identification badge, or a user device, and/or so forth.

At block 604, the automation hub 104 may detect a request to access the service location via an access request sensor connected to the hub. For example, the service location may be the building 102 and the access request may be from the service person. In various embodiments, the access request sensor may be a door buzzer or door intercom that is communicatively connected to the automation hub 104 and triggered by the service person.

At block 606, the automation hub 104 may send the personal authenticator of the service person to a verification server that verifies personal authenticators. In some embodiments, the verification server may contain information that indicates whether the service person associated with the personal authenticator is scheduled to perform a service call at the service location at the time and/or date at which the personal authenticator is received. Accordingly, the verification server may verify that the personal authenticator is valid if the service person is scheduled to make the service call. Otherwise, the verification server may return an indication that the personal authenticator is invalid.

At block 608, the automation hub 104 may receive a verification message from the verification server. In various embodiments, the verification server may send the verification message to the automation hub 104 via the network 112. At block 610, the automation hub 104 may determine whether the verification message indicates that the personal authenticator is verified as being valid for the service. Accordingly, at decision block 612, if the person authenticator is indicated as valid, the process 600 may proceed to block 614. At block 614, the automation hub 104 may generate a notification that the personal authenticator is valid for presentation on one or more connected user devices. In various embodiments, the one or more user devices may be connected to the automation hub 104 via the network 112 or a local area network. The notification may be in the form of a text message, an application alert, or an application pop-up banner.

However, if the person authenticator is indicated as invalid, the process 600 may proceed to block 616. At block 616, the automation hub 104 may generate a notification indicating that the personal authenticator is invalid for presentation on the one or more connected user devices. The invalidity of the personal authenticator may indicate to a user that the service person is not authorized to make the service call.

Figure 7:
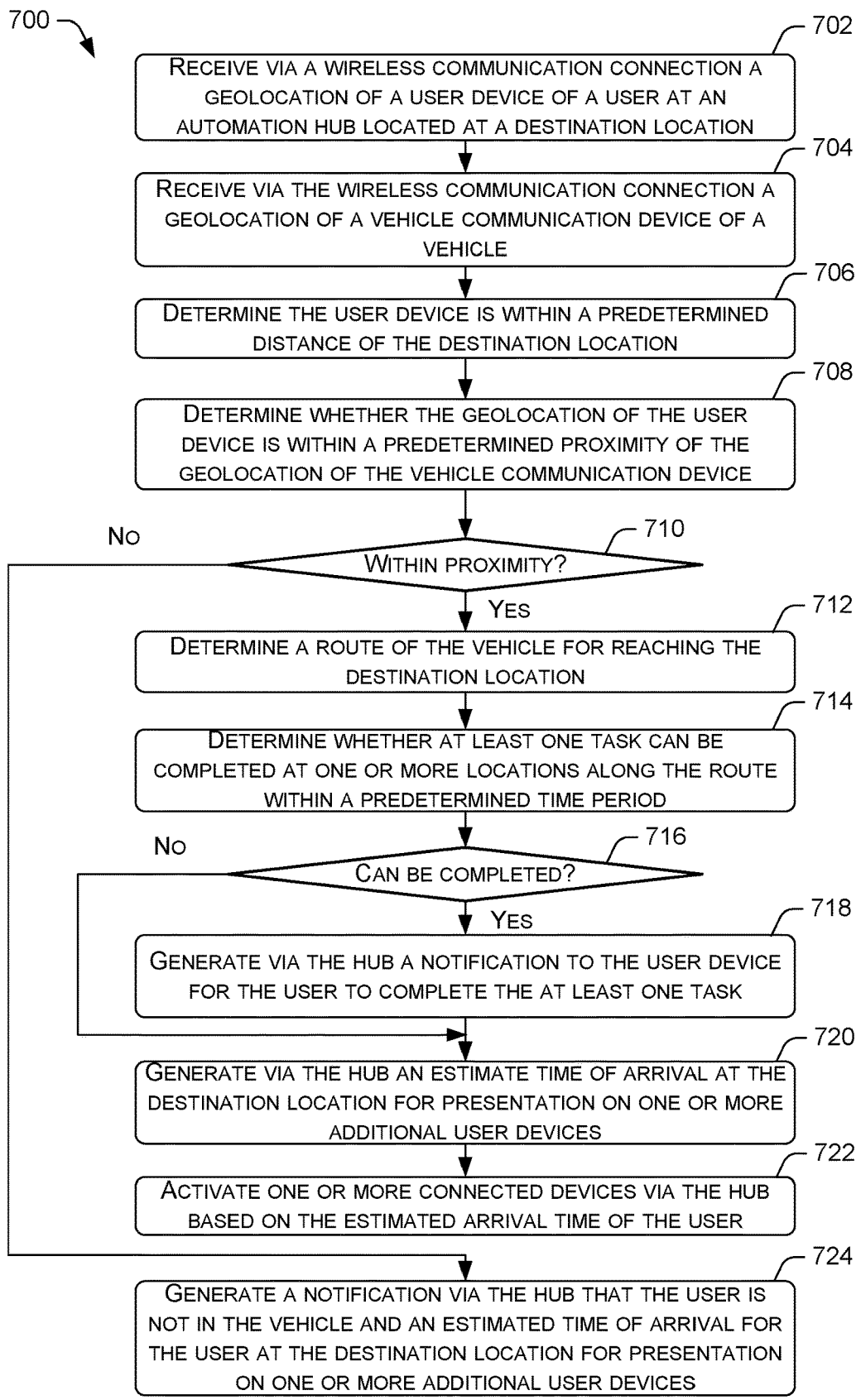
FIG. 7 is a flow diagram of an example process for using an automation hub to identify the status of a user and an associated vehicle in order to notify one or more additional users regarding the status.

FIG. 7 is a flow diagram of an example process 700 for using an automation hub to identify the status of a user and an associated vehicle in order to notify one or more additional users regarding the status. At block 702, the automation hub 104 at a destination location may receive via a wireless communication connection a geolocation of a user device of a user. In various embodiments, the wireless communication connection may be a cellular network connection. The geolocation may be provided by a GPS transceiver of the user device.

At block 704, the automation hub 104 at the destination location may receive via the wireless communication connection a geolocation of a vehicle communication device of a vehicle. In various embodiments, the vehicle communication device may provide communication, in-vehicle security, trouble diagnostics, and GPS navigation capabilities by communicating with multiple service providers via a cellular communication network.

At block 706, the automation hub 104 may determine that the user device is within a predetermined distance of the destination location. At block 708, upon determining that the user device is within the predetermined distance, the automation hub 104 may further determine whether the geolocation of the user device is within a predetermined proximity of the geolocation of the vehicle communication device. In various embodiments, the automation hub 104 may make such a determination by comparing the geolocation provided by the user device with the geolocation provided by the vehicle communication device.

Thus, at decision block 710, if the automation hub 104 determines that the geolocation of the user device is within the predetermined proximity of the geolocation of the vehicle communication device, the process 700 may proceed to block 712. At block 712, the automation hub 104 may determine a route of the vehicle for reaching the destination location. At block 714, the automation hub 104 may determine whether at least one task can be completed at one or more locations along the route within a predetermined time period. Thus, at decision block 716, if the automation hub 104 determines that the at least one task can be completed within the predetermined time period, the process 700 may proceed to block 718. At block 718, the automation hub 104 may generate a notification to the user device for the user to complete the at least one task. In various embodiments, the notification may be in the form of a text message, an application alert, or an application pop-up banner.

At block 720, the automation hub 104 may generate an estimated time of arrival at the destination location of the user for presentation on one or more additional user devices. In various embodiments, the additional user devices may belong to users or are otherwise accessible to users that are related to the user 116. At block 722, the automation hub 104 may activate one or more connected devices based on the estimated arrival time of the user. For example, the automation hub 104 may activate a heating, ventilation, and air conditioning (HVAC) system, a lighting system, an entertainment system, and/or so forth, to prepare for the expected arrival of the user 116 at the destination location.

Returning to decision block 716, if the automation hub 104 determines that no task can be completed within the predetermined time period, the process 700 may proceed directly to block 720. Returning to decision block 710, if the automation hub 104 determines that the geolocation of the user device is not within the predetermined proximity of the geolocation of the vehicle communication device, the process 700 may proceed to block 724. At block 724, the automation hub 104 may generate a notification that the user is not in the vehicle and an estimated time of arrival for the user at the destination location for presentation on one or more additional user devices.

The techniques may enable an automation hub to automatically identify the arrival of a package to a destination location and provide a notification of the delivery to a user. For example, a delivery person may drop off the package at an exterior entrance to the building while the user is away from the building. Accordingly, the user may make arrangements to secure the package to prevent theft or damage to the package. For example, the user may make a trip to the destination location to secure the package (e.g., move the package into the building) or arrange for another person to secure the package. In alternative instances, the verification of the identity of a delivery person or a service person who seeks entry into a destination building by the automation hub may provide a margin of safety to persons who are inside the destination building. This is because the persons inside may otherwise be fearful or reluctant to admit the delivery person or the service person. Furthermore, the detection of an imminent arrival of a user at a destination location may enable the automation hub to perform automatic actions that prepares for the arrival of the user at the destination.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
    detecting, at an automation hub, an event related to an uscr a service provider;
    obtaining, at the automation hub, a personal authenticator that identifies a user service provider via a sensor that is connected to the automation hub;
    sending, from the automation hub, the personal authenticator to a verification server;
    receiving, at the automation hub in response to the sending of the personal authenticator, a verification message having content regarding the personal authenticator;
    determining, at the automation hub in response to the receiving and content of the verification message, whether the personal authenticator is valid for the service provider in accordance with the verification message;
    activating, automatically at the automation hub in response to determining that the personal authenticator is valid for the service provider, one or more connected devices to perform one or more automatic actions;
    receiving a geolocation of the service provider; and
    sending, from the automation hub to the verification server, an expected time of arrival of the service provider to a service location based at least in part on the received geolocation of the service provider,
    wherein the verification message further has content regarding the expected time of arrival, and
    wherein the receiving of the verification message is further in response to the sending of the expected time of arrival.

2. The method of claim 1, wherein:
    the event is an imminent arrival of the service provider;
    the one or more automatic actions include generating a notification for presentation on the one or more connected devices that the service provider is authorized to perform a service; and
    the method further comprises:

generating a notification for presentation on the one or more connected devices notifying of the imminent arrival of the service provider;
detecting, at the automation hub, a request associated with the personal authenticator to access the service location related to an order for the service at the service location; and
generating, automatically by the automation hub in response to determining that the personal authenticator is invalid for the service provider, a notification for presentation on the one or more connected devices that the service provider is not authorized to perform the service.

3. The method of claim 2, wherein the one or more automatic actions include an automatic control of a device associated with a location at which the service provider will imminently arrive.

4. The method of claim 3, wherein the one or more automatic actions include unlocking a door.

5. The method of claim 2, wherein the personal authenticator identifies a particular service provider.

6. The method of claim 2, wherein the activating of the one or more devices that are connected to the automation hub is based at least in part on the estimated time of arrival of the service provider at the service location.

7. An automation hub at a destination having an access-controlled entrance, the automation hub comprising:
one or more processors;
memory storing computer-executable instructions that upon execution cause the one or more processors to perform acts comprising:
detecting, via a sensor that is connected to the automation hub, an event related to a service provider; and
receiving a geolocation of the service provider;
an authentication module to:
obtain a personal authenticator that identifies the service provider via the sensor;
send, to a verification server, the personal authenticator and an expected time of arrival of the service provider at a service location based at least in part on the received geolocation of the service provider;
receive, in response to the sending of the personal authenticator, a verification message relating to validity of the personal authenticator for the service provider;
determine, in response to receiving the verification message, whether the personal authenticator is valid for the service provider in accordance with the verification message; and
wherein the receiving of the verification message is further in response to sending the expected time of arrival;
a notification module to:
generate, automatically in response to determining that the personal authenticator is valid for the service provider, a notification for presentation on the one or more connected devices that the personal authenticator is authorized to perform the service; and
generate, automatically in response to determining that the personal authenticator is invalid for the service provider, a notification for presentation on one or more connected devices that the service provider is not authorized to perform the service; and
a controller module to manage, in accordance with an account, automatic activation of the one or more connected devices to perform one or more automatic actions in response to determining that the personal authenticator is valid for the user service provider.

8. The automation hub of claim 7, further comprising:
an account management module to customize the automation hub to manage, in accordance with an account, automatic activation of the one or more connected devices.

9. The automation hub of claim 7, wherein the notification that the personal authenticator is authorized to perform the service includes a prompt to grant access to the service provider.

10. The automation hub of claim 7, further comprising:
an analysis module to estimate the expected time of arrival of the service provider at the service location.

11. The automation hub of claim 7, further comprising a communication interface configured for the notification module to communicate over a telecommunication carrier network to the one or more connected devices.

12. The automation hub of claim 7, wherein the activating of the one or more connected devices is based at least in part on the expected time of arrival of the service provider at the service location.

13. One or more non-transitory computer-readable media that, if executed by one or more processors, cause the one or more processors to perform acts comprising:
detecting, at an automation hub, an event related to an user a service provider;
obtaining, at the automation hub, a personal authenticator that identifies a user service provider via a sensor that is connected to the automation hub;
sending, from the automation hub, the personal authenticator to a verification server;
receiving, at the automation hub in response to the sending of the personal authenticator, a verification message having content regarding the personal authenticator;
determining, at the automation hub in response to the receiving and content of the verification message, whether the personal authenticator is valid for the service provider in accordance with the verification message;
activating, automatically at the automation hub in response to determining that the personal authenticator is valid for the service provider, one or more connected devices to perform one or more automatic actions;
receiving a geolocation of the service provider; and
sending, from the automation hub to the verification server, an expected time of arrival of the service provider to a service location based at least in part on the received geolocation of the service provider,
wherein the verification message further has content regarding the expected time of arrival, and
wherein the receiving of the verification message is further in response to the sending of the expected time of arrival.

14. The one or more non-transitory computer-readable media of claim 13, wherein:
the event is an imminent arrival of the service provider;
the one or more automatic actions include generating a notification for presentation on the one or more connected devices that the service provider is authorized to perform a service; and
the acts further comprise:
generating a notification for presentation on the one or more connected devices notifying of the imminent arrival of the service provider;

detecting, at the automation hub, a request associated with the personal authenticator to access the service location related to an order for the service at the service location; and generating, automatically by the automation hub in response to determining that the personal authenticator is invalid for the service provider, a notification for presentation on the one or more connected devices that the service provider is not authorized to perform the service.

15. The one or more non-transitory computer-readable media of claim 14, wherein the one or more automatic actions include an automatic control of a device associated with a location at which the service provider will imminently arrive.

16. The one or more non-transitory computer-readable media of claim 15, wherein the one or more automatic actions include unlocking a door.

17. The one or more non-transitory computer-readable media of claim 14, wherein the personal authenticator identifies a particular service provider.

\* \* \* \* \*